United States Patent
Hiben et al.

(10) Patent No.: US 9,924,338 B1
(45) Date of Patent: Mar. 20, 2018

(54) CONNECTING COMMUNICATION NETWORKS VIA A NON-COLLOCATED RELAY

(71) Applicant: MOTOROLA SOLUTIONS, INC., Chicago, IL (US)

(72) Inventors: Bradley M. Hiben, Glen Ellyn, IL (US); David P. Gurney, Carpentersville, IL (US); Xiaowei Jin, Inverness, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/407,175

(22) Filed: Jan. 16, 2017

(51) Int. Cl.
*H04W 4/22* (2009.01)
*H04W 40/22* (2009.01)
*H04B 17/309* (2015.01)
*H04B 7/155* (2006.01)
*H04W 76/02* (2009.01)
*H04W 40/12* (2009.01)
(Continued)

(52) U.S. Cl.
CPC .......... *H04W 4/22* (2013.01); *H04B 7/15507* (2013.01); *H04B 17/309* (2015.01); *H04W 16/28* (2013.01); *H04W 40/12* (2013.01); *H04W 76/02* (2013.01); *H04W 40/22* (2013.01); *H04W 84/105* (2013.01)

(58) Field of Classification Search
CPC ... H04W 88/04; H04W 84/047; H04W 40/22; H04W 72/02; H04W 72/082; H04W 76/022; H04W 76/046; H04W 84/005; H04W 84/18; H04W 24/02; H04W 40/02; H04W 40/00; H04W 40/248; H04W 40/12; H04W 40/34; H04W 92/02; H04W 4/22; H04W 16/28; H04W 76/02; H04W 84/105; H04B 7/15507; H04B 17/309
See application file for complete search history.

(56) References Cited

U.S. PATENT DOCUMENTS 9,554,307 B2 * 1/2017 Chen .................... H04W 16/02
2011/0051654 A1 3/2011 Blankenship et al.
(Continued)

OTHER PUBLICATIONS

Motorola Solutions, Inc., Barricaded Suspect Incident Analysis, Enhancing Critical Incident Response with Public Safety Ltd., brochure (2011) pp. 1-16.

*Primary Examiner* — Daniel Lai
(74) *Attorney, Agent, or Firm* — Michael Best & Friedrich LLP (57) ABSTRACT

A method of and relay for connecting communication networks. In one example, the relay is a non-collocated relay that includes a plurality of antennas including a first antenna and a second antenna and an antenna scanner connected to the plurality of antennas. The antenna scanner is configured to survey the plurality of antennas for signals from a first base station of a first incident area network and a second base station of a second incident area network. The non-collocated relay also includes a first user device and a second user device communicatively coupled to each other and an electronic processor. The electronic processor is configured to connect the first antenna receiving a signal from the first base station to the first user device and connect the second antenna receiving a signal from the second base station to the second user device.

16 Claims, 4 Drawing Sheets

(51) Int. Cl.
*H04W 16/28* (2009.01)
*H04W 84/10* (2009.01)

(56) References Cited

U.S. PATENT DOCUMENTS

| | | | |
|---|---|---|---|
| 2011/0194483 A1 | 8/2011 | Ji et al. | |
| 2016/0192165 A1* | 6/2016 | Agulnik | H04W 4/22 455/404.2 |
| 2016/0198389 A1* | 7/2016 | Cao | H04W 76/02 370/315 |

* cited by examiner

CONNECTING COMMUNICATION NETWORKS VIA A NON-COLLOCATED RELAY

BACKGROUND OF THE INVENTION

Organizations such as public safety agencies may need to deploy their own communication networks (for example, incident area networks) at incident locations to address poor coverage, capacity, or security requirements. Some incidents may involve large or multiple areas that may not be adequately covered by a single incident area network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In situations where a single incident area network may not be sufficient to cover an incident area, public safety agencies may deploy multiple incident area networks to provide coverage to their subscribers. While deploying multiple incident area networks addresses deficiencies in coverage or capacity, the multiple incident area networks may not operate as a unified incident area network. This may be caused by limited connectivity between the networks. Limited connectivity may arise from interference between the networks, or self-interference at a particular node in the network. In addition, routing calls or data between subscriber or communication devices that are in different incident area networks can be complex. For example, a call or data packet might be routed from one incident area network through an external network and to a second incident area network. Although such a connection allows communication devices in different incident area networks to communicate with each other, a more direct connection between the multiple incident area networks can be advantageous. Such direct connections tend to have higher bandwidth (or capacity) and lower latency. In addition, the backhaul connection to an external network (for example, a wide area network) may be limited in throughput or latency (e.g., as for satellite backhaul links or weak wide area network signals).

A wired connection, for example, an Ethernet cable may be used to connect multiple incident area networks. However, using an Ethernet cable may be impractical for certain agencies that set up and take down incident area networks multiple times a day or week. In addition, rapidly deployable incident area networks may need to be set up quickly (for example, within minutes) at highly dynamic locations to be effective (including set up of their inter-network connectivity). In many circumstances, connecting networks by cable may take a relatively long period of time or require dedicated resources per network location. Instead of using a wired connection, another approach may be to use an out-of-band path such as, microwave, satellite, Wi-Fi, or other connection. However, these approaches require the use of additional spectrum that may not be readily available and may not be reliable. Yet another approach may be to use a relay collocated with one incident area network to use an in-band path to transmit and receive communications from a second incident area network. But because the first incident area network and the second incident area network may operate at the same frequency and/or time, the collocated relay may experience harsh interference.

One embodiment provides a method for connecting communication networks including estimating, using an antenna scanner of a non-collocated relay, a signal quality for a plurality of spatial paths for signals from a first base station of a first incident area network and a second base station of a second incident area network. The method also includes connecting, with an electronic processor and an antenna controller of the non-collocated relay, a first spatial path from the plurality of spatial paths receiving a signal from the first base station to a first user device and connecting, with the electronic processor and the antenna controller, a second spatial path from the plurality of spatial paths receiving a signal from the second base station to a second user device. The method further includes communicatively coupling the first user device and the second user device. The method also includes providing, with the electronic processor, an indication to a first backhaul management entity of the first incident area network that the first incident area network is connected to the second incident area network through the non-collocated relay and providing, with the electronic processor, an indication to a second backhaul management entity of the second incident area network that the second incident area network is connected to the first incident area network through the non-collocated relay.

Another embodiment provides a non-collocated relay for connecting communication networks having a plurality of antennas including a first antenna and a second antenna. The non-collocated relay also includes an antenna scanner connected to the plurality of antennas and configured to estimate a signal quality for the plurality of antennas for signals from a first base station of a first incident area network and a second base station of a second incident area network. The non-collocated relay further includes a first user device and a second user device communicatively coupled to each other and connected to the plurality of antennas via an antenna controller and an electronic processor connected to the antenna scanner, the first user device, the second user device, and the antenna controller. The electronic processor is configured to connect, using the antenna controller, the first antenna receiving a signal from the first base station to the first user device and connect, using the antenna controller, the second antenna receiving a signal from the second base station to the second user device. The electronic processor is also configured to provide an indication to a first backhaul management entity of the first incident area network that the first incident area network is connected to the second incident area network through the non-collocated relay and provide an indication to a second backhaul management entity of the second incident area network that the second incident area network is connected to the first incident area network through the non-collocated relay Another embodiment provides a method for connecting communication networks including receiving, via a transceiver at an electronic processor of a backhaul management entity of a first incident area network, data packets directed to a second incident area network from a communication device in the first incident area network. The method also includes determining, with the electronic processor, whether a base station of the first incident area network is connected to a non-collocated relay communicating with the second incident area network. The method further includes when the base station is connected to the non-collocated relay, routing, with the electronic processor, the data packets to the non-collocated relay and when the base station is not connected to the non-collocated relay, routing, with the electronic processor, the data packets to an external network.

Figure 1:
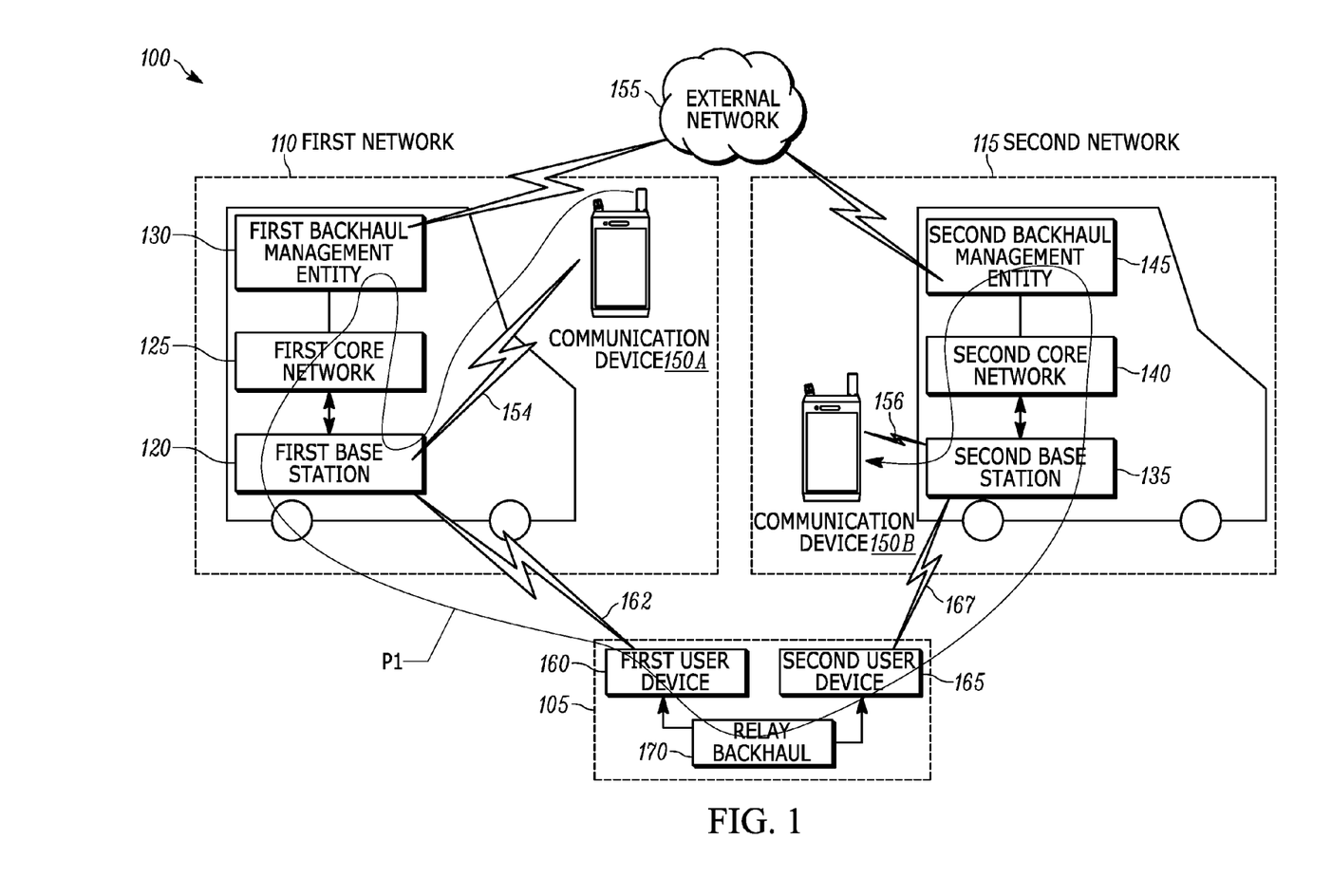
FIG. 1 is a diagram of a system for connecting communication networks in accordance with some embodiments.

FIG. 1 illustrates one embodiment of a system 100 for connecting communication networks in accordance with some embodiments. In the example illustrated, the system 100 includes a non-collocated relay 105 that connects a first incident area network 110 and a second incident area network 115. The first incident area network 110 includes a first base station 120, a first core network 125, and a first backhaul management entity 130. Similarly, the second incident area network 115 includes a second base station 135, a second core network 140, and a second backhaul management entity 145. The first incident area network 110 and the second incident area network 115 may be deployed by an organization, for example, a public safety agency to provide network coverage at incident locations to members of the public safety agency. In one example, the first incident area network 110 may be deployed using a first vehicle operated by a police or fire department at a first location and the second incident area network 115 may be deployed using a second vehicle operated by the police or fire department at a second location. In some embodiments, the first vehicle and the second vehicle may be deployed for the same incident.

The first incident area network 110 and the second incident area network 115 provide network coverage to communication devices 150 (such as, communication device 150A within the first incident area network 110 and communication device 150B within the second incident area network 115) via wireless communications links 154 and 156, respectively. The communication devices 150 may be, for example, two-way radios, smart telephones, tablet computers, laptop computers, vehicle-mounted modems, drone-mounted radios, and the like. The communication devices 150 may also be referred to as portable communication devices, mobile communication devices, subscriber devices, user devices, user equipment, and the like. The communication devices 150 may communicate with each other over the first incident area network 110 and the second incident area network 115. In addition, the communication devices 150 may receive application services, for example, from application servers located in an external network 155 through the first incident area network 110 and the second incident area network 115. In some embodiments, the application services may also reside locally along with the other network devices within the first incident area network 110 and/or the second incident area network 115. For example, a push-to-talk (voice over internet protocol (VOIP)) or video server may reside along with the first core network 125 or the second core network 140. The external network 155 may be, for example, a private network or a carrier network such as a global system for mobile communications (GSM) network, a high speed packet access (HSPA) network, a code-division multiple access (CDMA) network, a long-term evolution (LTE) network, a Project "25" network, a terrestrial trunked radio (TETRA) network, a satellite network, and the like.

The first base station 120 provides coverage to communication devices 150 within the first incident area network 110. The first base station 120 may be, for example, a Node B, an Evolved Node B (eNB), and the like. The first base station 120 includes a transceiver and one or more antennas to communicate directly with the communication devices 150. The first base station 120 facilitates data flow between the communication devices 150 and the first core network 125, if present. The first base station 120 and the second base station 135 may be portable or mobile base stations (for example, the first base station 120 and the second base station 135 may be mounted in the trunk of a police vehicle, on a fire-truck, on a drone, or the like). The first core network 125 may be, for example, an evolved packet core (EPC) network, or the like and controls various services provided to the communication devices 150. For example, the first core network 125 may authenticate communication devices 150, manage mobility within the first incident area network 110, route calls from the communication devices 150, route data packets between communication devices 150 and application servers, and the like. In some embodiments, the first core network 125 may reside elsewhere, for example, in an external network, in the second incident area network 115, or the like. The first backhaul management entity 130 may provide routing and connection between the first core network 125 and the external network 155. The first backhaul management entity 130, as will be described below, may also provide routing between the first incident area network 110 and the second incident area network 115 either through the external network 155 (if present) or through the non-collocated relay 105. Data may be routed through either the external network 155 or the non-collocated relay 105 depending on the quality of service levels required for each connection. In some embodiments, the first backhaul management entity 130 may be part of the first core network 125 or part of the first base station 120 (for example, in embodiments where the core network functionality is not present). The second base station 135, the second core network 140, and the second backhaul management entity 145 function similar to the first base station 120, the first core network 125, and the first backhaul management entity 130 respectively.

The non-collocated relay 105 allows communication between the first incident area network 110 and the second incident area network 115 in addition to or without the use of the external network 155. The non-collocated relay 105 provides a local, low-latency inter-incident area network data link. This may sometimes be referred to as a side-haul link. The non-collocated relay 105 includes a first user device 160 connected to the first base station 120 via a wireless communication link 162 and a second user device 165 connected to the second base station 135 via a wireless communication link 167. The first user device 160 may be connected to the second user device 165 through a relay backhaul management entity 170. The non-collocated relay 105 may not be collocated with network equipment (for example, base station, core network, or backhaul management entity) of either the first incident area network 110 or the second incident area network 115. In the example described above, the non-collocated relay 105 may be deployed using a third vehicle at a third location for the same or different incident.

FIG. 1 illustrates only one exemplary embodiment of the system 100 for connecting communication networks in accordance with some embodiments. The system 100 may include more or fewer components and may perform functions other than those explicitly described herein. In some embodiments, the second incident area network 115 may be an extension of the first incident area network 110. For example, the second incident area network 115 may not include the second core network 140 and the second backhaul management entity 145. In these embodiments, the second base station 135 communicates with the first core network 125 and the first backhaul management entity 130 through the non-collocated relay 105 to provide coverage to communication devices 150 within the second incident area network.

Figure 2:
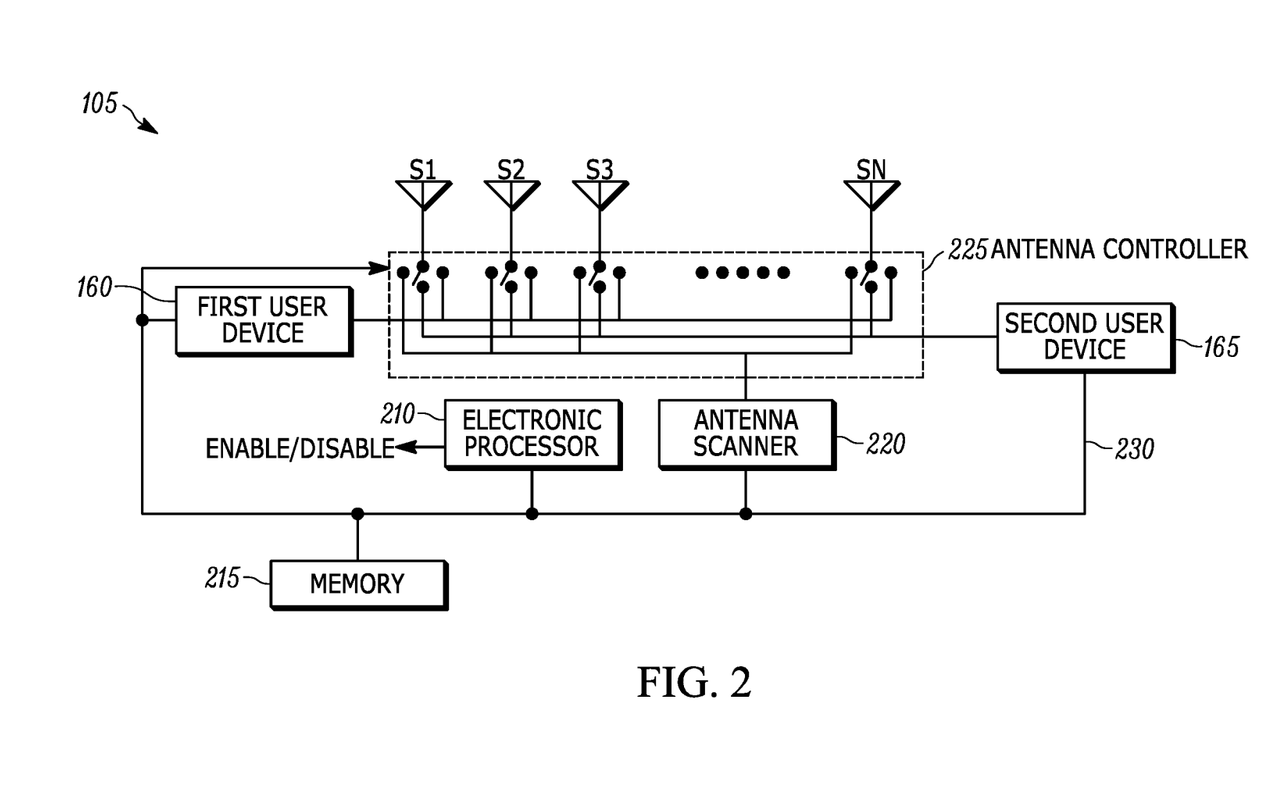
FIG. 2 is a diagram of a non-collocated relay in accordance with some embodiments.

FIG. 2 illustrates one embodiment of the non-collocated relay 105. In the example illustrated, the non-collocated relay 105 includes the first user device 160, the second user device 165, an electronic processor 210, a memory 215, an antenna scanner 220, and an antenna controller 225. The first user device 160, the second user device 165, the electronic processor 210 and the antenna scanner 220 may communicate over one or more control and/or data buses (for example, communication bus 230). The electronic processor 210 (for example, a relay electronic processor), the memory 215, the antenna scanner 220, and the antenna controller 225 together form the relay backhaul management entity 170.

The first user device 160 and the second user device 165 may be, for example, vehicle modems, USB modems, subscriber radios, aerial devices, fixed devices, or the like that are capable of communicating with the first base station 120 and/or the second base station 135 using a wireless communication protocol such as long term evolution (LTE), or the like. In some embodiments, the first user device 160 and the second user device 165 may also be communication devices 150 such as two-way radios, or the like.

In some embodiments, the electronic processor 210 is implemented as a microprocessor with separate memory, such as the memory 215. In other embodiments, the electronic processor 210 may be implemented as a microcontroller or digital signal processor (with memory 215 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 215 may not be needed or be modified accordingly. In the example illustrated, the memory 215 includes non-transitory, computer-readable memory that stores instructions that are received and executed by the electronic processor 210 to carry out functionality of the non-collocated relay 105 described herein. The memory 215 may include, for example, a program storage area and a data storage area. The program storage area and the data storage area may include combinations of different types of memory, such as read-only memory and random-access memory.

The antenna scanner 220 may be connected to a plurality of antennas S1 to SN through the antenna controller 225. Using the antennas S1 to SN, the antenna scanner 220 scans for radio signals from, for example, the first base station 120 and the second base station 135. The plurality of antennas S1 to SN provide a plurality of spatial paths between the first base station 120, the second base station 135, and/or other base stations, and the non-collocated relay 105. In some embodiments, the plurality of antennas S1 to SN may provide a plurality of spatial paths between a single base station (for example, the first base station 120 or the second base station 135) and the non-collocated relay 105 as described further below. Scanning may be performed in different spatial directions (for example, over 60 degree sectors) to identify different communication networks or incident area networks that are present. Scanning may also be performed in three dimensions, for example, to identify an overhead drone incident area network. The antenna controller 225 is controlled by the electronic processor 210 and connects the antennas S1 to SN to one of the first user device 160, the second user device 165, or the antenna scanner 220. The antenna scanner 220 may detect attributes of incident area networks that are within its range. For example, the antenna scanner 220 may detect a network identifier, a received signal strength indicator (RSSI), a reference signal received power (RSRP), a reference signal received quality (RSRQ), signal to interference plus noise ratio (SINR), channel quality indicator (CQI), and the like of the incident area networks that are within its range. In some embodiments, the antenna scanner 220 and/or the antenna controller 225 may be implemented in software and executed by the electronic processor 210. The antennas S1 to SN may be implemented using, for example, logical antennas, sectored antennas, phased array narrow-beam directional antennas, mechanically steerable antennas, and the like. In some embodiments, multiple directional antennas S1 to SN may be replaced by a smaller number of electronically steerable antennas (for example, an antenna array) or mechanically steerable antennas. For example, two steerable antennas may be connected, one each to the first incident area network 110 and the second incident area network 115. Additional antennas may be incorporated to communicate with additional base stations. The antennas S1 to SN may utilize differing polarization (for example, horizontal, vertical, and the like) to help discern signals from different base stations (possibly in the same direction).

In some embodiments, the non-collocated relay 105 may also include a core network (not shown) and/or a base station (not shown) similar to the core network 125 and the base station 120 of the first incident area network 110. This allows the agency operating the non-collocated relay 105 more flexibility in using the non-collocated relay 105 to either create an additional incident area network or to act as a relay between the first incident area network 110 and the second incident area network 115, depending on the overall system needs. In some embodiments, the first backhaul management entity 130 and the second backhaul management entity 145 are similar to the relay backhaul management entity 170. But, rather than being used as a relay, the first backhaul management entity 130 and the second backhaul management entity 145 are used to deploy the first incident area network 110 and the second incident area network 115 respectively. In these embodiments, the electronic processor 210 may provide an enable/disable signal to the core network and/or the base station attached to the relay backhaul management entity 170, the first backhaul management entity 130, or the second backhaul management entity 145 to use them to either deploy an incident area network or to deploy a non-collocated relay. In some embodiments, whether the non-collocated relay 105 acts as a relay or creates an incident area network is based on a location of the non-collocated relay 105. The electronic processor 210 determines that the non-collocated relay 105 is at a first location. The electronic processor 210 generates an enable signal for enabling the base station (for example, a third base station) of the non-collocated relay 105 based on determining that the non-collocated relay 105 is at the first location. The non-collocated relay 105 then creates a third incident area network based on the location of the non-collocated relay 105.

FIG. 2 illustrates only one exemplary embodiment of the non-collocated relay 105 in accordance with some embodiments. The non-collocated relay 105 may include more or fewer components and may perform functions other than those described herein.

Figure 3:
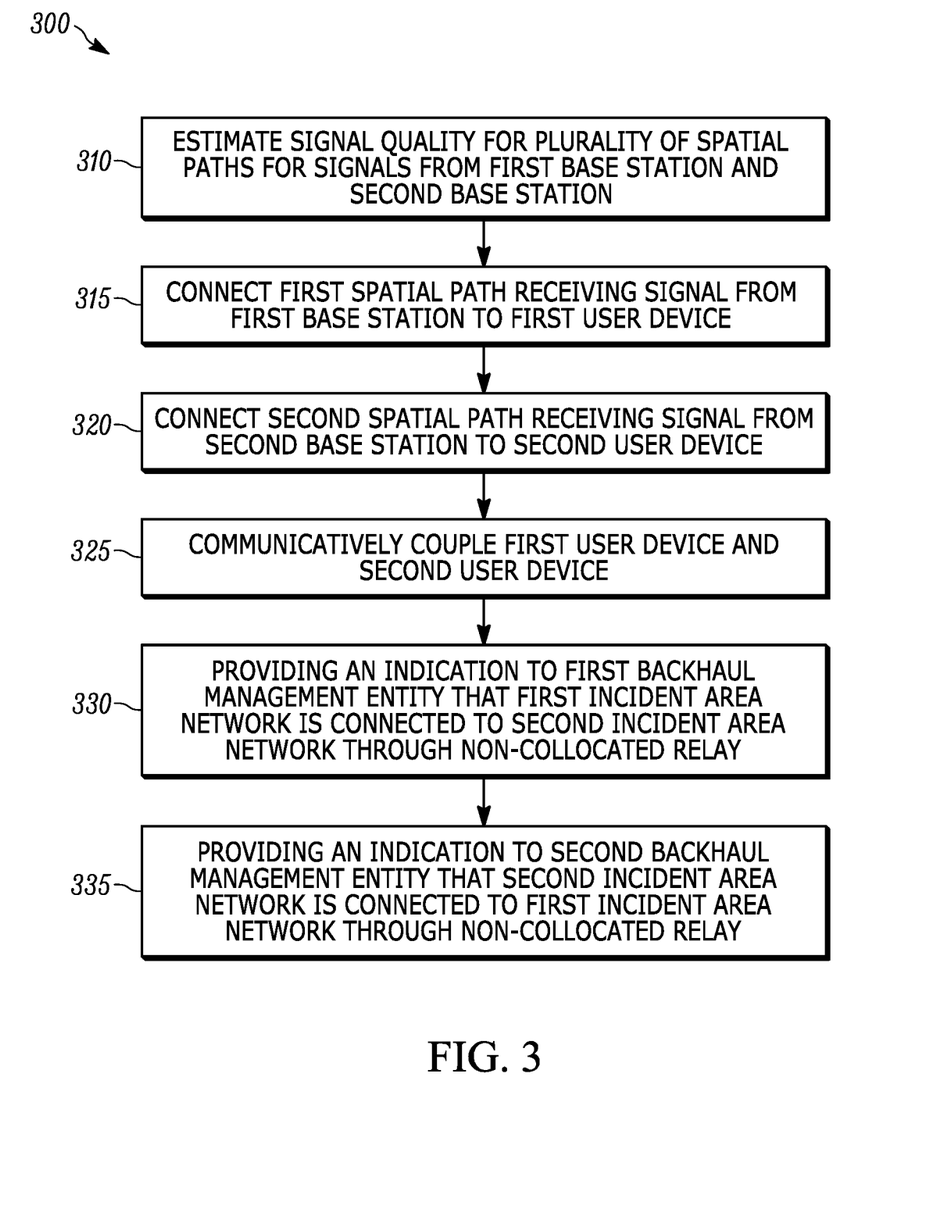
FIG. 3 is a flowchart of a method for connecting communication networks in accordance with some embodiments.

FIG. 3 is a flowchart illustrating one example method 300 for connecting communication networks. As illustrated in FIG. 3, the method 300 includes estimating, using the antenna scanner 220, signal quality for a plurality of spatial paths for signals from the first base station 120 and the second base station 135 (at block 310). As described above, the plurality of spatial paths may be formed between the plurality of antennas S1 to SN (whether directional antennas, electrically or mechanically steerable antennas, software directed antennas, or the like) and the first base station 120 and/or the second base station 135. The electronic processor 210 may then determine which of the antennas S1 to SN receive signals from each of the first base station 120 and the second base station 135. For example, the electronic processor 210 may determine that a first spatial path is formed between the first antenna S1 and the first base station 120 and a second spatial path is formed between a second antenna S2 and the second base station 135.

In some embodiments, the non-collocated relay 105 may have information regarding the location of the first base station 120, the second base station 135, and the non-collocated relay 105. Location information may be tracked for public safety vehicles that may contain communication devices 150, base stations, or non-collocated relays 105. The non-collocated relay 105 may select or point the antennas S1 to SN in the direction of the first base station 120 and the second base station 135 to receive signals from the first base station 120 and the second base station 135. In some embodiments, the orientation of vehicles containing the first base station 120, the second base station 135, or the non-collocated relay 105 may be obtained (for example, in degrees referenced to true north) from a magnetic or inertial sensor to determine the proper antenna S1 to SN pointing angle to optimally receive the desired signal from the first base station 120 or the second base station 135, while minimizing interference from other base stations. The first antennas S1 may receive an optimal signal from the first base station 120 when, for example, the ratio of the signal power of the signal from the first base station 120 to the sum of interference plus noise from all other sources (for example, particularly from the second base station 135) is the maximum compared to the other antennas S2 to SN. The desired antenna pointing angle may depend of the orientation of the first base station 120, the second base station 135, and the non-collocated relay 105. As described above, in some embodiments, pointing may be achieved through physical antennas (for example, sectorized or relatively fixed directional antennas), electronically steerable antennas (for example, phased antenna array), or by mechanically steered antennas (for example, a rotatable directional antenna).

The method 300 also includes connecting, with the electronic processor 210 and the antenna controller 225, a first spatial path receiving a signal from the first base station 120 to the first user device 160 (at block 315). The electronic processor 210 controls the antenna controller 225 to connect the first spatial path (for example, the first antenna S1) to the first user device 160. In some embodiments, the electronic processor 210 may determine that a first subset of spatial paths (for example, a first subset of antennas) from the plurality of spatial paths including the first spatial path receive a signal from the first base station 120. The electronic processor 210 may use several criteria to connect the first user device 160 to a spatial path. The electronic processor 210 may control the antenna controller 225 to connect the first user device 160 to the first spatial path after evaluating signal-to-interference plus noise ratios (SINR), received signal strength indicators (RSSI), reference signal received power (RSRP), reference signal received quality or channel quality indicator (RSRQ or CQI) or the like among the first subset of spatial paths receiving a signal from the first base station 120. For example, in some embodiments, the electronic processor 210 may connect the first user device 160 to the first spatial path when the first spatial path has the highest signal-to-interference plus noise ratio, received signal strength indicator, reference signal received power, reference signal received quality, channel quality indicator, or the like among the first subset of spatial paths. In some embodiments, the electronic processor 210 may predict or estimate which antenna/spatial path or pointing direction will result in the highest signal to interference plus noise ratio (SINR), received signal strength indicators (RSSI), reference signal received power (RSRP), reference signal received quality or channel quality indicator (RSRQ or CQI) or the like, based on the operating locations, orientation or both of the first base station 120, the second base station 135, and the non-collocated relay 105. Orientation information may not be needed when the first base station 120 or the second base station 135 use omnidirectional antennas. However, as described above, orientation information of the non-collocated relay 105 may be helpful in determining pointing directions. Location and orientation information may be periodically re-evaluated to determine the optimal antenna pointing angles, especially if one of the first base station 120, the second base station 135, or the non-collocated relay 105 changes position.

The method 300 further includes connecting a second spatial path receiving a signal from the second base station 135 to the second user device 165 (at block 320). The electronic processor 210 controls the antenna controller 225 to connect the second spatial path (that is, the second antenna S2) to the second user device 165. As described above, in some embodiments, the electronic processor 210 may determine that a second subset of spatial paths (for example, second subset of antennas) from the plurality of spatial paths including the second spatial path receive a signal from the second base station 135. The electronic processor 210 may use several criteria to connect the second user device 165 to a spatial path. The electronic processor 210 may control the antenna controller 225 to connect the second user device 165 to the second spatial path after evaluating signal-to-interference plus noise ratios, received signal strength indicators (RSSI), reference signal received power (RSRP), reference signal received quality or channel quality indicator (RSRQ or CQI), or the like among the second subset of antennas receiving a signal from the second base station 135. For example, the electronic processor 210 may connect the second user device 165 to the second spatial path when the second spatial path has the highest signal-to-interference plus noise ratio, received signal strength indicator, reference signal received power, reference signal received quality, channel quality indicator, or the like among the second subset of antennas.

In some embodiments, the antennas S1 to SN may receive signals from more than two base stations. For example, a third antenna S3 may receive a signal from a third base station of a third incident area network to form a third spatial path. In these embodiments, the electronic processor 210 may determine which incident area networks to connect based on several criteria. For example, the electronic processor 210 may connect the first incident area network 110 and the third incident area network when the electronic processor 210 determines that the second incident area network 115 is connected to the first incident area network 110 through a second non-collocated relay. In some embodiments, the non-collocated relay 105, the first incident area network 110, and the second incident area network 115 may be geographically located in such a way that the non-collocated relay 105 may not be capable of choosing spatial paths to achieve an adequate signal to operate successfully. In these embodiments, the non-collocated relay 105 may instead be operated as a third incident area network rather than as a relay.

The method 300 also includes communicatively coupling the first user device 160 and the second user device 165 (at block 325). The first user device 160 and the second user device 165 are communicatively coupled, for example, over the communication bus 230. In some embodiments, a separate wired or wireless connection may also be established between the first user device 160 and the second user device 165. The electronic processor 210 may employ routing techniques to route communications between the first incident area network 110 and the second incident area network 115 through the first user device 160 and the second user device 165.

The method 300 includes providing (for example, by sending a message), with the electronic processor 210, an indication to the first backhaul management entity 130 that the first incident area network 110 is connected to the second incident area network 115 through the non-collocated relay 105. The electronic processor 210 may provide the indication through the wireless communication link 162 to the first backhaul management entity 130. This allows the first backhaul management entity 130 to include the additional route between the first incident area network 110 and the second incident area network 115 in the first backhaul management entity's 130 routing priorities and techniques.

The method 300 also includes providing (for example, by sending a message), with the electronic processor 210, an indication to the second backhaul management entity 145 that the second incident area network 115 is connected to the first incident area network 110 through the non-collocated relay 105. The electronic processor 210 may provide the indication through the wireless communication link 167 to the second backhaul management entity 145. This allows the second backhaul management entity 145 to include the additional route between the first incident area network 110 and the second incident area network 115 in the second backhaul management entity's 145 routing priorities and techniques.

In some embodiments, the first backhaul management entity 130 provides information regarding the communication device 150 currently attached to the first backhaul management entity 130 to the second backhaul management entity 145. Similarly, the second backhaul management entity 145 provides information regarding the communication device 150 currently attached to the second backhaul management entity 145 to the first backhaul management entity 130. In this manner, a full map of the network and connected devices may be created for routing calls or data packets over the first incident area network 110 and the second incident area network 115. In some embodiments, the first backhaul management entity 130 and the second backhaul management entity 145 may also receive information regarding the quality of the wireless communication links 162 and 167. The quality information of the wireless communication links 162 and 167 may include how much throughput, latency, quality of service, or the like is available over each link. This may assist in managing data traffic. For example, the incident area network (for example, the first incident area network 110 or the second incident area network 115) with the best connection to the external network may be used as a preferred path for routing data traffic to the external network 155.

Figure 4:
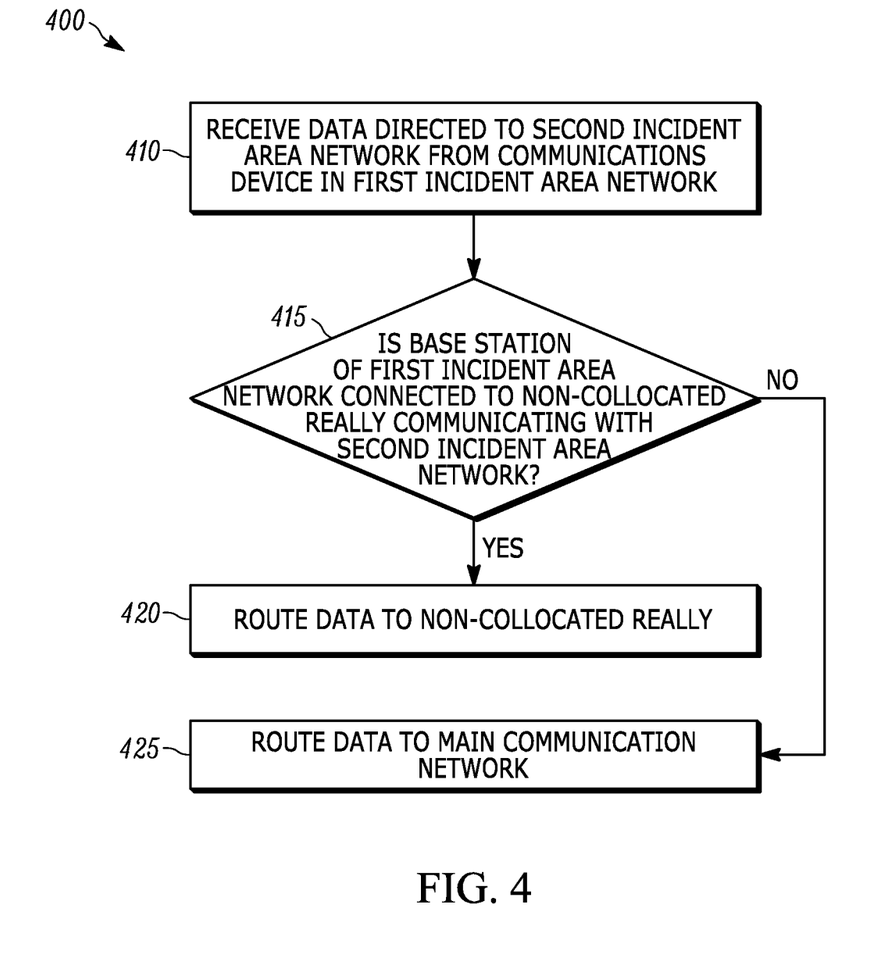
FIG. 4 is a flowchart of a method of directing communications between a backhaul management entity of a first incident area network and a non-collocated relay communicating with a second incident area network in accordance with some embodiments.

The first backhaul management entity 130 and the second backhaul management entity 145 may then route the communications to each other through the non-collocated relay 105 after receiving the indications. FIG. 4 is a flowchart illustrating one example method 400 of directing communications between the first backhaul management entity 130 of the first incident area network 110 and the non-collocated relay 105 communicating with the second incident area network 115. As illustrated in FIG. 4, the method 400 includes receiving, at the first backhaul management entity 130, data packets directed to the second incident area network 115 from a communication device 150A in the first incident area network 110 (at block 410). For example, the communication device 150A in the first incident area network 110 may need to place a call to the communication device 150B in the second incident area network 115 or contact an application server in the external network 155. In some embodiments, the first incident area network 110 may be temporarily or permanently unable to communicate with the external network 155, and may need to communicate through the second incident area network 115 via the non-collocated relay 105 to reach the external network 155. The communication device 150A sends the data packets pertaining to the call to the first backhaul management entity 130 through the first base station 120 and the first core network 125. With reference to FIG. 1, communication path P1 indicates the flow of communication between the communication device 150A (first communication device) and the communication device 150B (second communication device) through the non-collocated relay 105 path.

Referring to FIG. 4, the method 400 also includes determining whether the first base station 120 of the first incident area network 110 is connected to the non-collocated relay 105 communicating with the second incident area network 115 (at block 415). The first backhaul management entity 130 determines whether the first base station 120 is connected to the non-collocated relay 105. For example, the first backhaul management entity 130 may determine that the first base station 120 is connected to the non-collocated relay 105 based on an indication received from the non-collocated relay 105 as described above. In some embodiments, the non-collocated relay 105 may periodically re-evaluate the presence of other communication networks or incident area networks in order to adapt to dynamic operating conditions of the incident.

When the first backhaul management entity 130 determines that the first base station 120 is connected to the non-collocated relay 105, the first backhaul management entity 130 routes the data packets from the communication device 150A to the non-collocated relay 105 (at block 420). The first backhaul management entity 130 routes the data packets back through the first core network 125 and instructs the first base station 120 to transmit the data packets to the first user device 160. The relay backhaul management entity 170 receives the data packets through the first user device 160 and routes the data packets to the second user device 165, which then transmits the data packets to the second base station 135. The second backhaul management entity 145 receives the data packets through the second base station 135 and the second core network 140. The second backhaul management entity 145 then sends the data packets through the second core network 140 and instructs the second base station 135 to transmit the data packets to the communication device 150B.

When the first backhaul management entity 130 determines that the first base station 120 is not connected to the non-collocated relay 105, the first backhaul management entity 130 routes the data packets from the communication device 150A to the external network 155 if available (at block 425). The first backhaul management entity 130 sends the data packets to the external network 155 such as a carrier network that may in turn direct the data packets to the second backhaul management entity 145. The second backhaul management entity 145 then sends the data packets through the second core network 140 and instructs the second base station 135 to transmit the data packets to the communication device 150B. In some embodiments, the first backhaul management entity 130, the second backhaul management entity 145, and the relay backhaul management entity 170 may periodically evaluate the presence of non-collocated relays 105, and evaluate the available bandwidth on relay links to determine which traffic to route over those links. The electronic processor 210 of the non-collocated relay 105 may periodically evaluate the availability of the connected base stations, and the optimal pointing angle of the antennas S1 to SN to best reach each base station, for example, to maximize the signal-to-interference plus noise ratios (SINR), the received signal strength indicators (RSSI), the reference signal received power (RSRP), the reference signal received quality or channel quality indicator (RSRQ or CQI) or the like for each link. The electronic processor 210 may also asses the available bandwidth over those links, and report throughput, signal-to-interference plus noise ratios (SINR), received signal strength indicators (RSSI), reference signal received power (RSRP), or reference signal received quality or channel quality indicator (RSRQ or CQI) values of those links to the relay backhaul management entity 170, the first backhaul management entity 130, and/or the second backhaul management entity 145.

In some embodiments, the first base station 120 and the second base station 135 may operate on different frequencies to avoid interfering with each other. However, in certain networks such as code-division multiple access network, long-term evolution network, or the like, all base stations operate on the same frequency in a mode of operation referred to as single frequency reuse. Single frequency reuse provides more spectral efficiency than using different frequencies. However, single frequency reuse may result in interference between the first base station 120, the second base station 135, and the communication devices 150. Further, the first base station 120 and the second base station 135 may not be capable of transmitting to each other as, in part, they may interfere with each other. As a consequence, conventionally the first base station 120 and the second base station 135 may be connected to form a single network by using wired backhaul from each site to a common core network. Wireless backhaul may also be used, but, different spectrum or technology (for example, microwave) may be used, as described above. In the embodiments described above, by separating the relay 105 (that is, non-collocating the relay 105) from the first base station 120 and the second base station 135, the interference due to the base stations is reduced.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for connecting communication networks, the method comprising:
   estimating, using an antenna scanner of a non-collocated relay, a signal quality for a plurality of spatial paths for signals from a first base station of a first incident area network and a second base station of a second incident area network;
   connecting, with an electronic processor and an antenna controller of the non-collocated relay, a first spatial path from the plurality of spatial paths receiving a signal from the first base station to a first user device based on the signal quality;
   connecting, with the electronic processor and the antenna controller, a second spatial path from the plurality of spatial paths receiving a signal from the second base station to a second user device based on the signal quality;
   communicatively coupling the first user device and the second user device;
   providing, with the electronic processor, an indication to a first backhaul management entity of the first incident area network that the first incident area network is connected to the second incident area network through the non-collocated relay; and
   providing, with the electronic processor, an indication to a second backhaul management entity of the second incident area network that the second incident area network is connected to the first incident area network through the non-collocated relay.

2. The method of claim 1, further comprising:
   determining, with the electronic processor, that the non-collocated relay is at a first location;
   generating, with the electronic processor, an enable signal for enabling a third base station connected to the non-collocated relay based on determining that the non-collocated relay is at the first location; and
   creating a third incident area network based on the enable signal.

3. The method of claim 1, further comprising:
   determining, with the electronic processor, that a first subset of spatial paths from the plurality of spatial paths, including the first spatial path, receive a signal from the first base station; and
   wherein connecting, with the electronic processor and the antenna controller, the first spatial path from the plurality of spatial paths receiving the signal from the first base station to the first user device includes evaluating one selected from a group consisting of signal-to-interference plus noise ratios, received signal strength indicators, reference signal received power, channel quality indicators, and reference signal received quality among the first subset of spatial paths.

4. The method of claim 1, further comprising:
   determining, with the electronic processor, that a second subset of spatial paths from the plurality of spatial paths, including the second spatial path, receive a signal from the second base station; and
   wherein connecting, with the electronic processor and the antenna controller, the second spatial path from the plurality of spatial paths receiving the signal from the second base station to the second user device includes evaluating one selected from a group consisting of signal-to-interference plus noise ratios, received signal strength indicators, reference signal received power, channel quality indicators, and reference signal received quality among the second subset of spatial paths.

5. The method of claim 1, wherein the first spatial path and the second spatial path are formed by phased array narrow-beam directional antennas.

6. The method of claim 5, further comprising:
   pointing a first antenna forming the first spatial path to the first base station based on a location of the first base station; and
   pointing a second antenna forming the second spatial path to the second base station based on a location of the second base station.

7. The method of claim 1, further comprising:
   determining, with the electronic processor, that the second incident area network is connected to the first incident area network through a second non-collocated relay;
   estimating, using the antenna scanner, a signal quality for the plurality of spatial paths for a signal from a third base station of a third incident area network; and
   connecting, with the electronic processor and the antenna controller, a third spatial path from the plurality of spatial paths receiving the signal from the third base station to the second user device based on the signal quality.

8. A non-collocated relay for connecting communication networks, the non-collocated relay comprising:
- a plurality of antennas including a first antenna and a second antenna;
- an antenna scanner connected to the plurality of antennas and configured to estimate a signal quality for the plurality of antennas for signals from a first base station of a first incident area network and a second base station of a second incident area network;
- a first user device and a second user device communicatively coupled to each other and connected to the plurality of antennas via an antenna controller; and
- an electronic processor connected to the antenna scanner, the first user device, the second user device, and the antenna controller, the electronic processor configured to:
  - connect, using the antenna controller, the first antenna receiving a signal from the first base station to the first user device based on the signal quality;
  - connect, using the antenna controller, the second antenna receiving a signal from the second base station to the second user device based on the signal quality;
  - provide an indication to a first backhaul management entity of the first incident area network that the first incident area network is connected to the second incident area network through the non-collocated relay; and
  - provide an indication to a second backhaul management entity of the second incident area network that the second incident area network is connected to the first incident area network through the non-collocated relay.

9. The non-collocated relay of claim 8, wherein the electronic processor is further configured to:
- determine that the non-collocated relay is at a first location;
- generate an enable signal for enabling a third base station connected to the electronic processor based on determining that the non-collocated relay is at the first location; and
- create a third incident area network based on the enable signal.

10. The non-collocated relay of claim 8, wherein the electronic processor is further configured to:
- determine that a first subset of antennas from the plurality of antennas, including the first antenna, receive a signal from the first base station; and
- wherein connecting, using the antenna controller, the first antenna receiving the signal from the first base station to the first user device includes evaluating one selected from a group consisting of signal-to-interference plus noise ratios, received signal strength indicators, reference signal received power, channel quality indicators, and reference signal received quality among the first subset of antennas.

11. The non-collocated relay of claim 8, wherein the electronic processor is further configured to:
- determine that a second subset of antennas from the plurality of antennas, including the second antenna, receive a signal from the second base station; and
- wherein connecting, using the antenna controller, the second antenna receiving the signal from the second base station to the second user device includes evaluating one selected from a group consisting of signal-to-interference plus noise ratios, received signal strength indicators, reference signal received power, channel quality indicators, and reference signal received quality among the second subset of antennas.

12. The non-collocated relay of claim 8, wherein the first antenna and the second antenna are phased array narrow-beam directional antennas.

13. The non-collocated relay of claim 12, wherein the first antenna is pointed to the first base station based on a location of the first base station; and
- wherein the second antenna is pointed to the second base station based on a location of the second base station.

14. The non-collocated relay of claim 8, wherein the electronic processor is further configured to:
- determine that the second incident area network is connected to the first incident area network through a second non-collocated relay;
- estimate, using the antenna scanner, a signal quality for the plurality of antennas for a signal from a third base station of a third incident area network; and
- connect, using the antenna controller, a third antenna from the plurality of antennas receiving the signal from the third base station to the second user device based on the signal quality.

15. A method for connecting communication networks, the method comprising:
- receiving, via a transceiver at an electronic processor of a backhaul management entity of a first incident area network, data packets directed to a second incident area network from a communication device in the first incident area network;
- determining, with the electronic processor, whether a base station of the first incident area network is connected to a non-collocated relay communicating with the second incident area network;
- when the base station is connected to the non-collocated relay, routing, with the electronic processor, the data packets to the non-collocated relay; and
- when the base station is not connected to the non-collocated relay, routing, with the electronic processor, the data packets to an external network.

16. The method of claim 15, the method further comprising:
- estimating, using an antenna scanner, a plurality of spatial paths for signals from the base station of the first incident area network and a second base station of the second incident area network;
- connecting, with a relay electronic processor and an antenna controller of the non-collocated relay, a first spatial path from the plurality of spatial paths receiving a signal from the base station to a first user device;
- connecting, with the relay electronic processor and the antenna controller, a second spatial path from the plurality of spatial paths receiving a signal from the second base station to a second user device; and
- communicatively coupling the first user device and the second user device.

* * * * *